(12) United States Patent
Robert et al.

(10) Patent No.: US 11,199,625 B2
(45) Date of Patent: Dec. 14, 2021

(54) RAPID SYNTHETIC FOCUS ULTRASONIC IMAGING WITH LARGE LINEAR ARRAYS

(71) Applicant: KONINKLIJKE PHILIPS N.V., Eindhoven (NL)

(72) Inventors: Jean-Luc Robert, Cambridge, MA (US); Man Nguyen, Melrose, MA (US); Ramon Quido Erkamp, Swampscott, MA (US); Sheng-Wen Huang, Ossining, NY (US); Emil George Radulescu, Ossining, NY (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 416 days.

(21) Appl. No.: 16/309,601

(22) PCT Filed: Jun. 12, 2017

(86) PCT No.: PCT/EP2017/064220
§ 371 (c)(1),
(2) Date: Dec. 13, 2018

(87) PCT Pub. No.: WO2017/220354
PCT Pub. Date: Dec. 28, 2017

(65) Prior Publication Data
US 2019/0187279 A1 Jun. 20, 2019

Related U.S. Application Data

(60) Provisional application No. 62/353,595, filed on Jun. 23, 2016.

(30) Foreign Application Priority Data

Jul. 28, 2016 (EP) .................................. 16181710

(51) Int. Cl.
G01S 15/89 (2006.01)
G01S 7/52 (2006.01)

(52) U.S. Cl.
CPC ...... G01S 15/8997 (2013.01); G01S 7/52046 (2013.01); G01S 7/52085 (2013.01);
(Continued)

(58) Field of Classification Search
None
See application file for complete search history.

(56) References Cited

U.S. PATENT DOCUMENTS 3,911,730 A * 10/1975 Niklas ................. G10K 11/345
73/624
4,145,931 A * 3/1979 Tancrell ................... A61B 8/08
73/626

(Continued)

FOREIGN PATENT DOCUMENTS

DE 19581711 B4 3/2010
EP 1757954 A2 2/2007

(Continued)

OTHER PUBLICATIONS

International Search Report and Written Opinion for International Application No. PCT/EP2017/064220, dated Sep. 21, 2017, 16 pages.

*Primary Examiner* — Hovhannes Baghdasaryan (57) ABSTRACT

An ultrasonic diagnostic imaging system and method translates an aperture across an array transducer which is less that the size of the array. At each aperture location a transmit beam is focused above, or alternatively below, the array and a region of interest being scanned from the aperture location, resulting in broad insonification of the region of interest. At the lateral ends of the array the aperture is no longer translated but the focal point of the transmit beam is translated from the same aperture position, preferably with tilting (Continued)

of the beam direction. Multiple receive beams are processed in response to each transmit event and the overlapping receive beams and echo locations are spatially combined to produce synthetic transmit focusing over the center of the image field and noise reduction by spatial compounding at the lateral ends of the image field.

14 Claims, 5 Drawing Sheets

(52) U.S. Cl.
CPC ...... *G01S 7/52095* (2013.01); *G01S 15/8927* (2013.01); *G01S 15/8995* (2013.01)

(56) References Cited

U.S. PATENT DOCUMENTS

| | | |
|---|---|---|
| 5,798,461 A | 8/1998 | Banta, Jr. et al. |
| 9,345,455 B2 | 5/2016 | Burcher |
| 2007/0049825 A1 | 3/2007 | Lee et al. |
| 2009/0069693 A1* | 3/2009 | Burcher .............. G01S 15/8995 600/459 |
| 2010/0030076 A1* | 2/2010 | Vortman .................. A61N 7/02 600/439 |
| 2016/0074016 A1 | 3/2016 | Park et al. |

FOREIGN PATENT DOCUMENTS

| | | |
|---|---|---|
| EP | 2107388 A1 | 10/2009 |
| JP | 2004057823 A | 2/2004 |
| JP | 2006340890 A | 12/2006 |
| WO | 9603918 A1 | 2/1996 |
| WO | 2007133882 A2 | 11/2007 |

\* cited by examiner

RAPID SYNTHETIC FOCUS ULTRASONIC IMAGING WITH LARGE LINEAR ARRAYS

This application is the U.S. National Phase application under 35 U.S.C. § 371 of International Application No. PCT/EP2017/064220, filed on Jun. 12, 2017, which claims the benefit of European Application Serial No. 16181710.1, filed Jul. 28, 2016, and Provisional Application Ser. No. 62/535,595, filed Jun. 23, 2016. These applications are hereby incorporated by reference herein.

FIELD OF THE INVENTION

This invention relates to medical diagnostic ultrasound systems and, in particular, to synthetic focus ultrasonic imaging with large linear arrays.

BACKGROUND OF THE INVENTION

The principles of synthetic focusing, by which an ultrasound image is focused at every point in the image field, have been the subject of considerable investigation. For instance, U.S. Pat. No. 4,604,697 (Luthra et al.) describes a synthetic focus technique in which an ultrasound pulse is sequentially transmitted from each element of an ultrasonic transducer array. The echo signals received from each transmission is received by all of the elements of the array and are stored. After all of the signals have been received a focused echo signal can be formed at each point in the image field from the knowledge of the location of each transducer element relative to each point in the image and the time of flight of an ultrasound signal to and from each point. The appropriate received signals are combined to form a coherent echo signal for each point in the image. The selection of the stored data values used to form each point provides the beamformation for each point in the image. While this method will produce a focused signal at every point in the image field, it has several drawbacks. One is that the RF signals from the entire image field must be stored for processing. This requires a significant amount of information storage. A second drawback is that a significant amount of processing is required to select and weight the data for each point in the image, then combine the appropriately weighted data to compute the image data points. A third drawback is that this approach is effective for only a shallow penetration depth, since the energy transmitted by a single transducer element is limited.

A specific application which employs the basic principles of synthetic focusing is the traditional delay-and-sum receive beamformer, in which the delays applied to the signals from each receiving element are the equivalent of data selection in the synthetic focus technique. The traditional beamformer is a limited application of these principles as it transmits a transmit beam focused at a specific focal region and dynamically focuses echoes only along this single transmit beam. Multiple transmissions are thus required to scan the entire image field. A resulting efficiency is that data does not need to be stored for all transmissions to every point in the image; the data received from a transmission is immediately processed to form coherent echo signals along the beam direction. A limitation is that each received beam is focused on transmit at only the selected focal region. But the signal-to-noise ratio at greater depths is improved because multiple transducer elements are actuated to transmit a beam, enabling a reasonable penetration to be obtained.

Accordingly it is desirable to effect transmit focusing over at least a significant portion of an image but without the need to store vast amounts of RF data.

U.S. Pat. No. 8,137,272 (Cooley et al.) describes a diagnostic ultrasound system and method which effect transmit focusing over a significant depth of field without the need to store RF signal data. An ultrasound beam is transmitted which insonifies at least portions of multiple scanline locations and receive beams are concurrently processed along the multiple scanlines, e.g., in parallel or by time multiplexing. A succession of such transmissions produces multiple scanlines related to a common scanline location. Preferably, the related scanlines are concentrically aligned. The related scanline data is beamformed to produce echo data which is effectively transmit focused over a significant depth of field. In a typical implementation, an ultrasound system receives the simultaneous beams with a multiline beamformer. Such an ultrasound system can improve the frame rate of ultrasound imaging by reducing the need to resort to multizone focusing in some clinical applications.

Even more rapid imaging has been conducted by transmitting unfocused wavefronts known as plane waves. A plane wave can insonify a large portion of the image field, and thus only a few transmit intervals are needed to scan the region of interest, e.g., fifteen transmit waves. To improve resolution the plane waves can be steered in different directions and the received echo signals coherently combined, which not only improves the signal to noise ratio of the image signals but also reduces artifacts by spatial compounding, since the same point in an image is insonified multiple times from different beam directions. However, the ability to readily produce synthetic transmit focusing is lost as none of the received beams are co-aligned. Furthermore, the differently steered plane waves result in received signal overlap which varies in accordance with the steering angles used. This problem is exacerbated when a large array is used, one which requires that the image field be segmented with multiple steered plane waves transmitted over each segment. The overlap inhomogeneity will vary from one segment to another across the image field, resulting in transition artifacts between segments.

WO 2007/133882 A2 discloses an ultrasonic diagnostic imaging system adapted to transmit a plurality of focused beams normal to the plane of a transducer aperture and to receive multiple receive lines in response to each transmitted beam. Sub-apertures of the transducer aperture are defined by apodization and signals of the sub-apertures are aligned and combined to produce signals exhibiting the effect of transmit steering at different angles with respect to the sub-apertures. The steered signals are detected and the detected signals relating to common points in an image field are combined. The combined detected signals are used to produce an ultrasound image with reduced speckle.

SUMMARY OF THE INVENTION

Accordingly it is an object of the present invention to be able to carry out rapid scanning but without the overlap inhomogeneity and transition artifacts of the prior art techniques, while producing synthetic transmit focusing.

This object is solved by the independent claims. Advantageous embodiments are defined by the dependent claims.

In accordance with the principles of the present invention, an ultrasonic imaging system and method for an array transducer employs a transmit and receive active aperture which is translated across the array to scan an image field. The transmit beam at each aperture location is focused behind the array and a region of interest being scanned from the aperture location, or alternatively beyond the array and the region of interest being scanned from the aperture location, resulting in broad insonification of the region of interest. At the lateral ends of the array the aperture is no longer translated but the focal point of the transmit beam is translated from the same aperture position, preferably with rotation (tilting) of the beam direction. Multiple receive beams are processed by the ultrasound system in response to each transmit event and overlapping receive beams and echoes from common spatial locations are spatially combined to produce synthetic transmit focusing over the center of the image field and noise reduction by spatial compounding at the lateral ends of the image field.

DETAILED DESCRIPTION OF THE EMBODIMENTS

Figure 1:
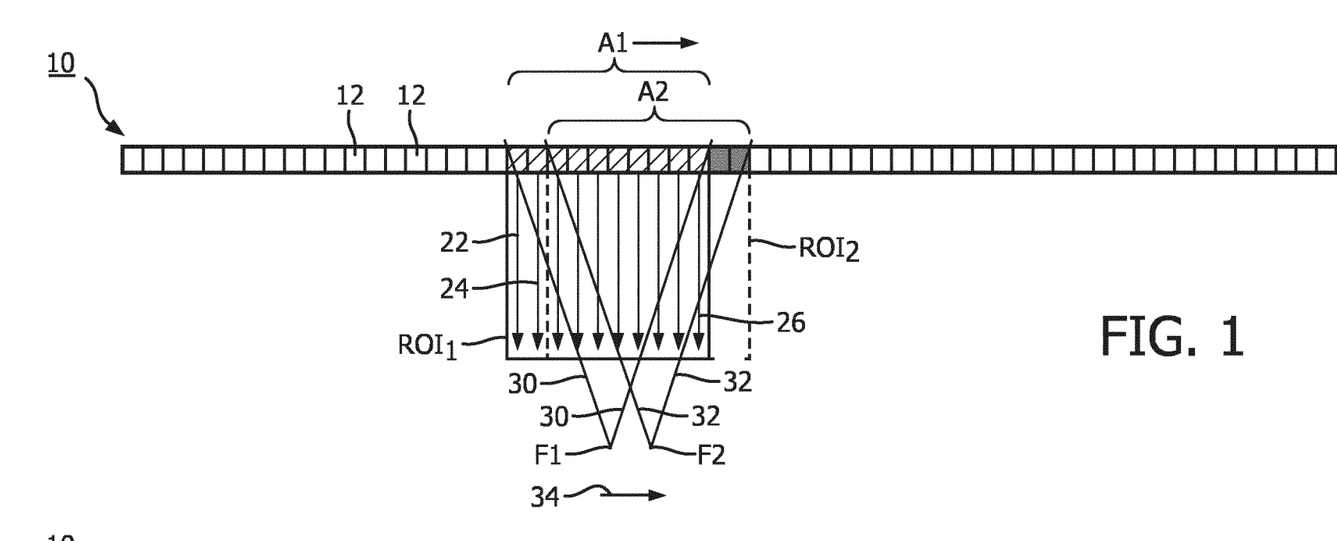
FIG. 1 illustrates ultrasonic scanning by translation of the active aperture across the center of an image field in two-element increments with transmit beams focused beyond the array transducer and the region of interest.

Referring first to FIG. 1, a large array 10 of transducer elements 12 is shown. In this example the image field in front of the array (below in the drawing) is scanned from an active aperture A of ten transducer elements 12, which is translated to different locations across the array. One aperture location A1 is indicated by a bracket, and a second aperture location A2 is indicated by a second bracket. In this example the A1 and A2 aperture locations overlap, with the A2 aperture comprising eight of the A1 aperture elements and an additional two elements to the right of the A1 aperture. A transmit beam is transmitted at each aperture location which is axially aligned with the center of the aperture. The transmit beams in this example have a focal point beyond (below) the array and a region of interest ROI. That is, from top to down in the figure, the array 10 is arranged on top, then there is the region of interest ROI disposed below the array 10, and finally the focal point is below both of them. The transmit beam transmitted from the A1 aperture is seen to converge at a focal point F1, as indicated by convergence lines 30. The broad transmit beam insonifies ten scanline positions in the $ROI_1$, scanlines 22, 24, . . . 26. Echo signals returned from the $ROI_1$ in response to a broad transmit beam are processed by multiline processors, which simultaneously produce coherent echo signals from along the ten scanlines 22, 24, . . . 26. Thus, one transmit beam produces ten received scanlines, which enables rapid scanning of the image field. After these ten scanlines have been received, the aperture is translated to the A2 aperture location as indicated by arrow 34 and the transmit-receive cycle is repeated, this time by transmitting another broad transmit beam focused at F2 beyond the array and the $ROI_2$ (indicated by dashed lines) and returning echo signals for the simultaneous formation of another ten scanlines. Eight of this new group of scanlines are axially aligned with the rightmost eight of the previously acquired scanlines, with two additional scanlines produced in the non-overlapping portion of $ROI_2$. It will be appreciated that previous and subsequent translations of the aperture will produce other scanlines in axial alignment with these two groups. Scanlines which are axially aligned are then coherently combined, with relative delays reflecting the offset of a scanline from its transmit beam center. The combined scanlines produce a scanline of coherent echo signals which have the characteristic of being separately transmit focused, the desired synthetic focus property for the echo information. Translation of the aperture across the large array 10 with a transmit-receive cycle at each aperture location will thus scan the entire image field in front of the array with both receive and synthetic transmit focusing.

Figure 2:
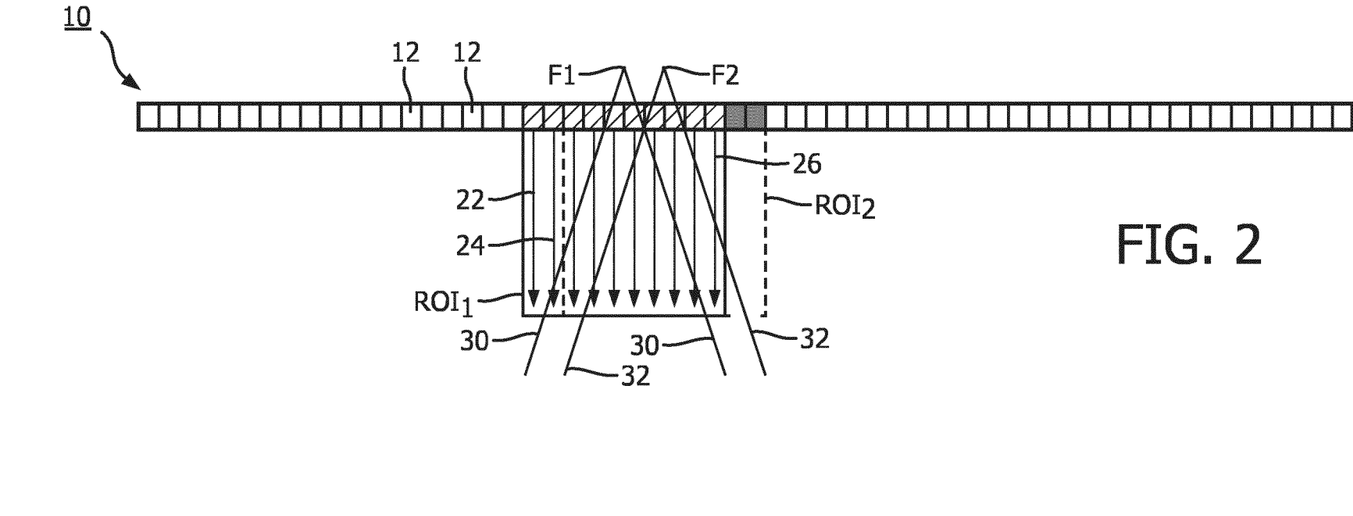
FIG. 2 illustrates ultrasonic scanning by translation of the active aperture across the center of an image field in two-element increments with transmit beams focused above (i.e., behind) the array transducer and the region of interest.

FIG. 2 illustrates another scanning technique like that of FIG. 1, with a difference in the focal property of the broad transmit beams. In this example each transmit beam is focused behind (above in the drawing) the transducer array 10 and the ROIs, and diverges as it passes through the ROIs, rather than converge as was the case in FIG. 1. That is, from bottom up in the figure, the region of interest ROI is arranged at the bottom, then there is the array 10 disposed above the region of interest ROI, and finally the focal point is above both of them. All other operation of the scanning of FIG. 2 is the same, including the translation of the aperture across the array in two-element increments from one aperture location to an adjacent aperture location. The result is the same as with the technique of FIG. 1. Scanning from translated aperture locations and combining co-aligned multiline scanlines produce an image with the characteristics of both receive and synthetic transmit focusing.

Figure 3:
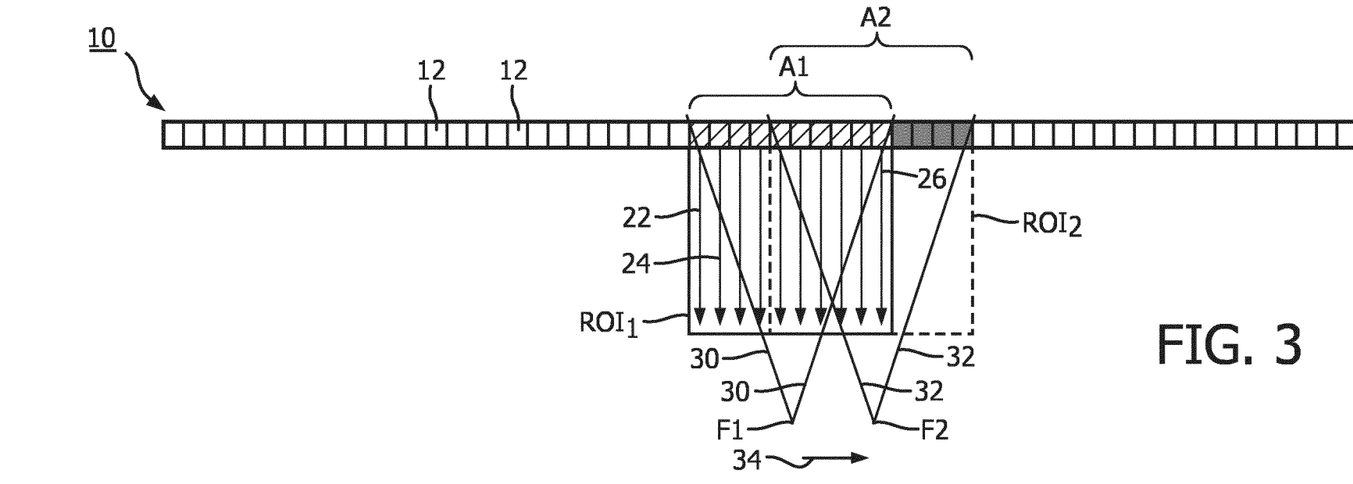
FIG. 3 illustrates ultrasonic scanning by translation of the active aperture across the center of an image field in four-element increments with transmit beams focused beyond the array transducer and the region of interest.
Figure 4:
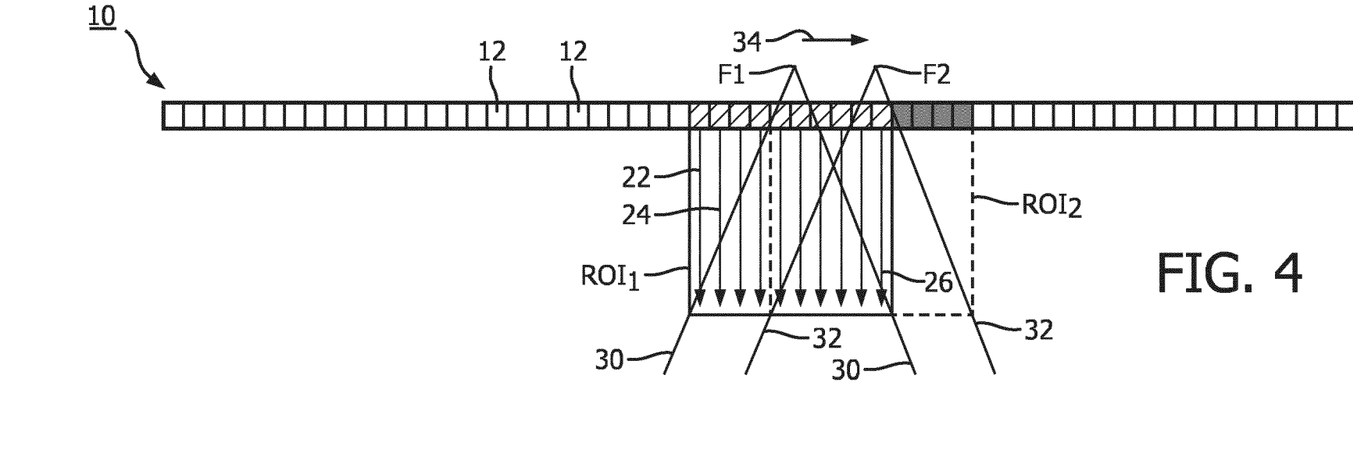
FIG. 4 illustrates ultrasonic scanning by translation of the active aperture across the center of an image field in four-element increments with transmit beams focused above the array transducer and the region of interest.

FIGS. 3 and 4 illustrate large array scanning techniques like those of FIGS. 1 and 2, except that the aperture location is translated in increments of four transducer elements rather than two. This means that translation of the active aperture across the entire array will be more rapid than was the case in FIGS. 1 and 2, and hence images will be produced with a higher frame rate of display. But the greater translation increments mean that there will be fewer overlapping co-aligned multiline received scanlines at each scanline position, meaning that the synthetic transmit focusing effect will be diminished as compared with the two-element translation increments of FIGS. 1 and 2. There is thus a tradeoff of synthetic focusing precision for higher frame rate of display.

Figure 5A:
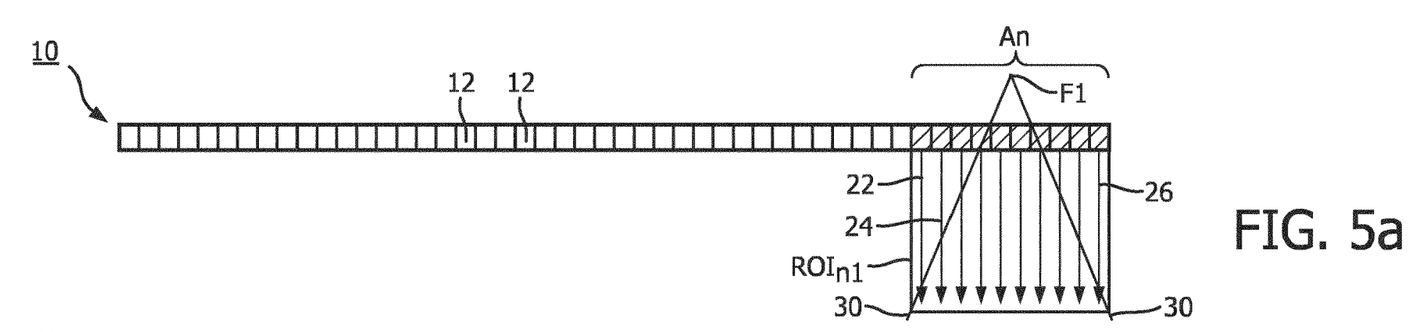
FIGS. 5a, 5b and 5c illustrate ultrasonic scanning at the end of a large array from a stationary aperture with successive translation of the focal point of the transmit beam and tilting of the beam angle.
Figure 5B:
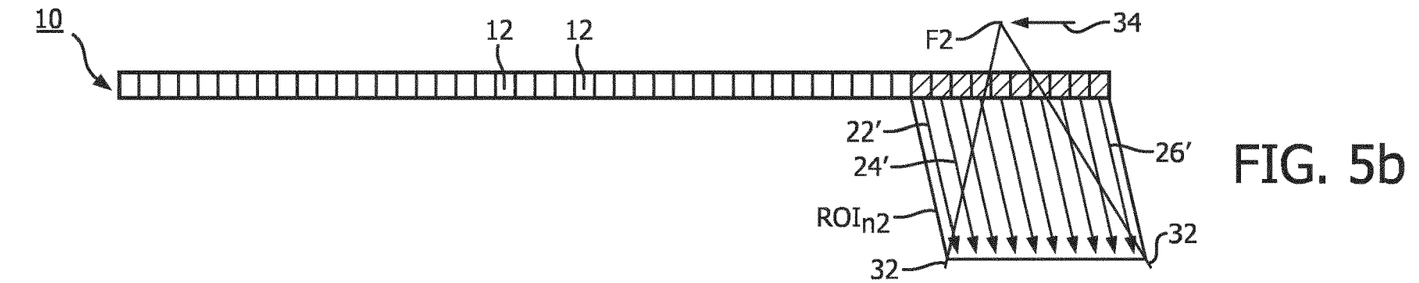
Figure 5C:
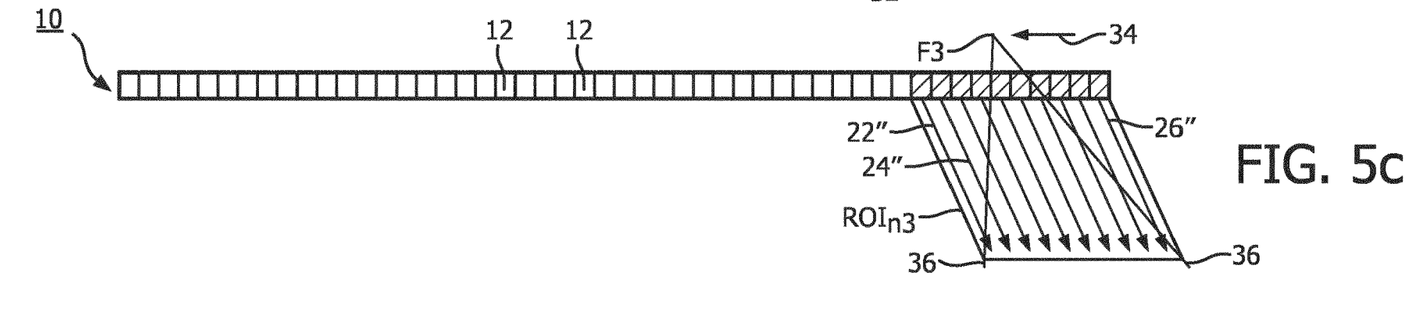

At the lateral ends of the array 12 the ten-element aperture An can no longer be translated as shown in FIGS. 5a, 5b, and 5c. To prevent an inhomogeneity in received scanline overlap at these lateral aperture positions the aperture is no longer translated, but the focal point of the transmit beams is translated together with inclination of the transmit and receive beam angles with respect to the plane of the face of the array as shown in FIGS. 5a, 5b, and 5c. In FIG. 5a a beam is transmitted across the ROI from a focal point centered on and behind the ROI as before; FIG. 5a shows in addition the transmit beam focus being behind the array at F1 and diverging as indicated by lines 30 as it passes through the $ROI_{n1}$ as was the case in FIGS. 2 and 4. Scanlines 22, 24, ... 26 are received in response to this first transmit beam. The next transmit-receive cycle is illustrated in FIG. 5b, where the F2 focal point is translated to the left (towards the center of the array) as indicated by arrow 34 and the transmit beam is diverging as indicated by lines 32 and centered on a tilted $ROI_{n2}$, with the transmit beam angled to the right and the received scanlines 22', 24', ... 26' also angled to the right in the $ROI_{n2}$. In the next transmit-receive cycle depicted in FIG. 5c the focal point F3 for the transmit beam is translated further to the left as indicated by the arrow 34. Compared to the previous example a shift of the lateral location of F3 closer to the center of the array compared to the lateral location of F2 causes a transmit beam steered with an increased angle to still emanate from the active aperture size An. The transmit beam diverges across the $ROI_{n3}$ as indicated by lines 36 and the tilt of the $ROI_{n3}$ is greater than in FIG. 5a or 5b, with multiline scanlines concurrently received at scanline locations 22', 24", ... 26". It is seen that the transmit beam and scanlines 22, 24, ... 26 received from $ROI_{n1}$ are at a zero angle (orthogonal) to the face of the array, whereas the transmit beams and received multilines for scanline sets 22', 24', ... 26' and 22", 24", ... 26" are at a non-zero angle (not) 90° to the face of the array. The three sets of received scanlines will not be axially co-aligned but spatially intersect each other and the echoes received from each common point of intersection are combined to produce coherent echo signals which are spatially compounded, as each echo in a combination is produced from a differently positioned and angled transmit beam. The image quality at the ends of the array is thus enhanced by spatial compounding. While FIGS. 5a-5c illustrate this operation for transmit beams with a focal point behind the array 10 and the $ROI_n$, the technique can also be carried out with transmit beams focused beyond (below in FIGS. 5a-5c) the array 10 and the ROI as was the case in the examples of FIGS. 1 and 3. This operation is carried out at both the left and right ends of the array, thereby producing an image which is enhanced by synthetic transmit focusing or spatial compounding across the entire image field of the large array 10.

Figure 6A:
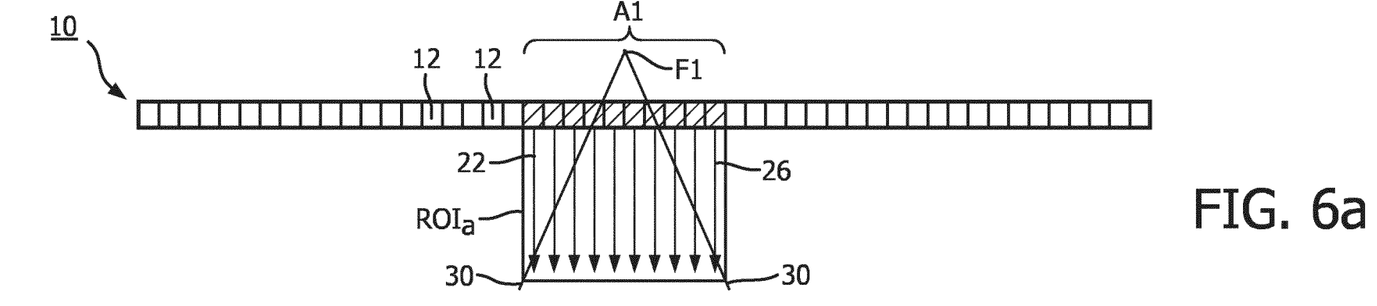
FIGS. 6a, 6b, and 6c illustrate successive translation of the transmit focal point and beam angle tilt from the same aperture location at the center of a large array to effect spatial compounding.
Figure 6B:
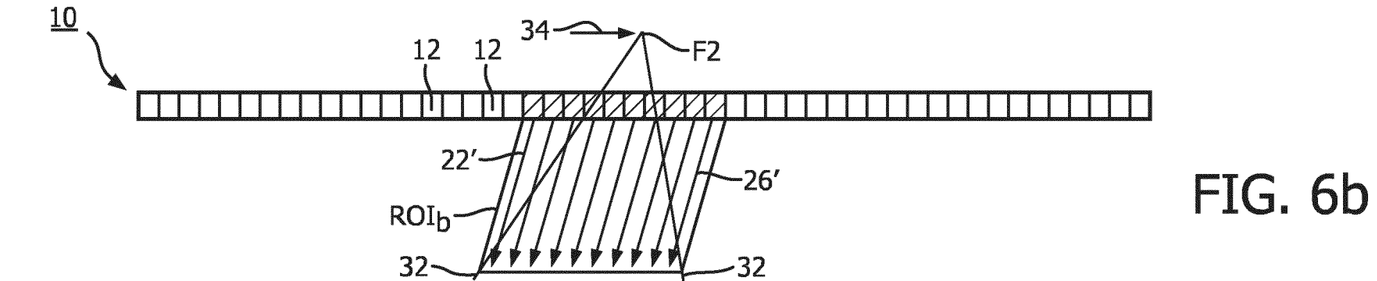
Figure 6C:
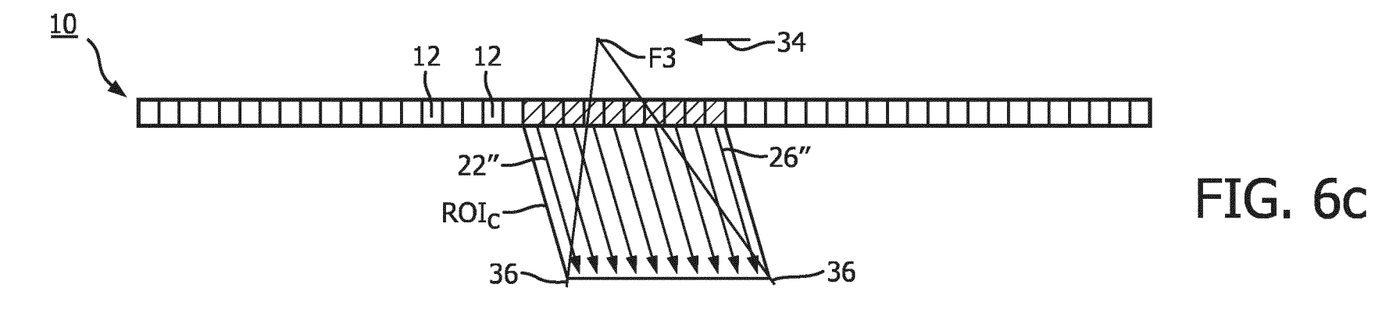

If desired, enhancement of the entire image field by spatial compounding can be effected by transmitting two or more beams from different focal points for each aperture location as illustrated in FIGS. 6a, 6b, and 6c. In this example of three transmit beam angles, a transmit beam is transmitted from focal point F1 behind, or alternatively beyond, the array 10 and the ROI (the case behind the array and the ROI is shown in these drawings) with a zero steering angle (normal to the array) as was the case in FIGS. 1-4. As before, ten multiline scanlines 22, ... 26 with a zero steering angle are received from $ROI_a$ as shown in FIG. 6a. In FIG. 6b the F2 focal point of the transmit beam is translated to the right with respect to the location of F1 as indicated by arrow 34 and a diverging transmit beam as indicated by lines 32 is transmitted across an $ROI_b$ which is tilted to the left. The transmit beam is thus transmitted at a non-zero angle and so the received multiline scanlines 22' ... 26' are received at a non-zero angle as shown in FIG. 6b. In FIG. 6c the transmit beam focal point is translated to the left with respect to the location of F1 and a broad diverging transmit beam with a different non-zero angle is transmitted across the $ROI_c$. Scanlines 22" ... 26" are received at the same non-zero angle as the transmit beam. Echoes received from common points of the three sets of scanlines are coherently combined to effect spatial compounding. This same procedure is repeated for the different aperture locations across the array. While the image quality is improved by reason of spatial compounding across the entire image field, the frame rate of display will be decreased by reason of and in proportion to the multiple transmit-receive cycles carried out at each active aperture location.

Figure 7:
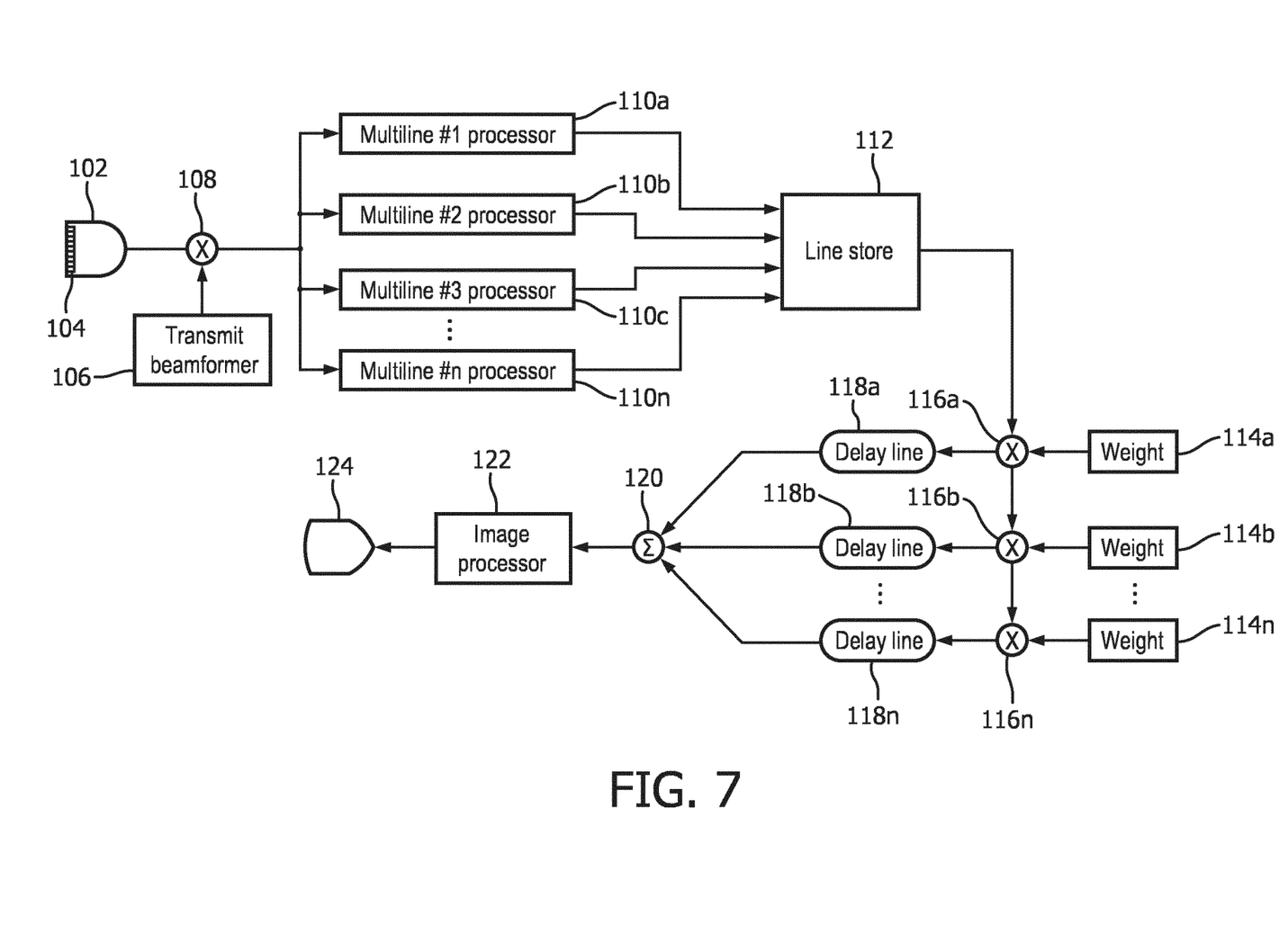
FIG. 7 illustrates in block diagram form an ultrasound system constructed in accordance with the principles of the present invention.

FIG. 7 illustrates in block diagram form an ultrasonic imaging system constructed in accordance with the principles of the present invention. An ultrasonic probe 102 includes a large linear array 104 of transducer elements. Selected groups of the transducer elements at different aperture positions are actuated at respectively delayed times by the transmit beamformer 106 to transmit beams focused at selected focal regions in front of (i.e., beyond), or alternatively behind, the array and a region of interest and in the desired directions, which are centered on a region of interest. The transmit beamformer is coupled to the transducer elements by a transmit/receive switch 108 which may comprise a crosspoint switch that protects the receiver inputs from the high voltage transmit pulses applied. The echoes received by each transducer element of the active aperture of the array 104 in response to each transmit beam are applied to the inputs of multiline processors 110a-110n. Each multiline processor comprises a receive beamformer which applies its own set of delays and, if desired, apodization weights to weight the received echoes from the array elements, which are then combined to form one of a plurality of differently steered receive beams from a single transmit event. Suitable multiline beamformers for the multiline processors 110a-110n may be found, for instance, in U.S. Pat. No. 6,695,783 (Henderson et al.) and U.S. Pat. No. 5,318,033 (Savord). The outputs of the multiline processors 110a-110n are coupled to a line store 112 which stores the received multilines at least until all of the multilines needed to form a line of display data have been acquired. The group of multilines used to form a particular line of display data are applied to respective ones of multipliers 116a-116n to produce the display data for the corresponding line location. The echo data from each line may, if desired be weighted by apodization weights 114a-114n. In general, these weights will weight each line as a function of its round-trip impulse response. A suitable weighting algorithm can be derived by letting the term amplitude (x,z) be the insonification amplitude of a point at location (x,z) in the image field by the transmit wave-front, the azimuth position x=0 corresponding to the center axis of the transmit beam. Let X be the azimuth of the received multiline with respect to the transmit beam axis. The weight applied to this received multiline to form a point of the image at depth Z is:

$$\text{Weight}(X,Z) = \text{amplitude}(X,Z)$$

For determination of an appropriate delay characteristic, let propagation_time(x,z) be the propagation time needed by the transmit wavefront to reach a point at location (x,z), the azimuth x=0 corresponding again to the center axis of the transmit beam. Let X be the azimuth of the receive line with respect to the transmit beam axis. The delay experienced by a received multiline at a point of the image at depth Z is:

$$\text{Delay}(X,Z) = \text{propagation\_time}(X,Z) - \text{propagation\_time}(0,Z)$$

where propagation_time(0,Z) is the time to reach a point at the same depth but on-axis. It is this delay which must be compensated for by the delay applied by delay lines 118 in a positive or negative sense as appropriate.

The functions amplitude(X,Z) and propagation_time(X, Z) may, for example, be obtained from a simulation of the transmit field. An appropriate way to compute the propagation time is to use the phase delay of the field from monochromatic simulation at several frequencies. The amplitude may be computed by averaging the amplitude of the field at several frequencies. In addition, a depth-dependent normalization can be applied to the weights. This multiplies all the weights at a given depth by a common factor. For example, the normalization can be chosen so that speckle regions have uniform brightness with depth. By varying the weights as a function of depth, it is possible to vary the size and shape (apodization) of the aperture dynamically with depth.

The amplitude and propagation time do not need to be derived from a simulation of the exact transmit characteristics used in the system. The designer may choose to use a different aperture size or a different apodization for example.

The echoes from each line are weighted by the multipliers 116a-116n and delayed by delay lines 118a-118n. In general, these delays will be related to the location of the transmit beam center to the receive line location as shown above. The delays are used to equalize the phase shift variance that exists from line to line for the multilines with differing transmit-receive beam location combinations, so that signal cancellation will not be caused by phase differences of the combined signals.

It will be appreciated that in a digital system the delay lines may be effected by storing the weighted multiline echo data in memory and reading the data out at later times which effect the necessary delay. Shift registers of differing lengths and clock signals may also be used to effect a digital delay, or an interpolating beamformer such as that described in the aforementioned U.S. Pat. No. 6,695,783 may be used. The delayed signals are combined by a summer 120 (i.e., a summing block or adder) and the resultant signals are coupled to an image processor 122. The image processor may perform scan conversion or other processing to improve the displayed image. The resultant image is displayed on an image display 124.

In the system of FIG. 7 the delay lines 118 and summer 120 effect a refocusing of the signals received from the several receive multilines which are co-aligned in a given direction. The refocusing adjusts for the phase differences resulting from the use of different transmit beam locations for each multiline, preventing undesired phase cancellation in the combined signals. The weights 114 weight the contributions of the multilines in relation to the proximity of the transmit beam to the multiline location, giving higher weight to receive beams with higher signal-to-noise ratios. This results in an extended depth of field along each receive line and an enhanced penetration (improved signal-to-noise ratio) due to the combination of multiple samplings in each receive line direction.

The system illustrated in FIG. 7 is effective for producing synthetically focused image data from co-aligned scanlines. For spatial compounding as shown for the lateral ends of the array in FIGS. 5a-5c and also if desired across the image field as shown in FIGS. 6a-6c, spatial compounding can be performed as shown in FIG. 1 of U.S. Pat. No. 6,210,328 (Robinson et al.) As there shown, received scanline data from differently oriented transmit beams, stored in the line store 112 of FIG. 7 herein, is filtered and detected, then processed by pre-processing (e.g., weighting), spatial resampling, and combining scanline data received from common points in the image field. The combined scanline data is thereby spatially compounded to improve image quality.

In an implementation of the present invention it is not necessary that the multilines to be combined for synthetic transmit refocusing or spatial compounding all be precisely axially co-aligned or precisely spatially intersecting. Multilines which are to be combined can be offset from each other, and an interpolation can be performed before the multiline signals are combined. The principles of the present invention are also applicable to three dimensional imaging by performing the processing in both the elevation and azimuth dimensions, and to the use of curved linear arrays.

The present invention relates to a method for ultrasonic imaging having an array transducer comprising:

translating an aperture which is less than the number of elements of the array across a plurality of aperture locations of the array;

at the plurality of aperture locations transmitting a transmit beam which is focused either behind the array and a region of interest in an image field or beyond the array and the region of interest in the image field;

in response to each transmit beam, receiving at the aperture a plurality of echo signals which are processed to produce a plurality of simultaneous multiline scanlines of coherent echo signals;

at an aperture location at the end of the array, transmitting a plurality of transmit beams which are focused either behind the array and a region of interest in the image field or beyond the array and the region of interest in the image field, and receiving in response to each transmit beam a plurality of echo signals which are processed to produce a plurality of simultaneous multiline scanlines of coherent echo signals, wherein each transmit beam transmitted from the aperture location at the end of the array has a different focal point location.

In this method translating an aperture may further comprise translating an aperture which is less than the number of elements of a linear array across a plurality of aperture locations of the linear array.

The invention claimed is:

1. A method for ultrasonic imaging with an array comprising a plurality of transducer elements, the method comprising:

translating an aperture across a plurality of aperture locations of the array by sequentially activating different portions of the plurality of transducer elements at corresponding ones of the plurality of aperture locations, wherein a number of transducer elements of individual ones of the different portions of the plurality of transducer elements is less than a number of the plurality of transducer elements of the array;

at each of the plurality of aperture locations in a transmit-receive cycle:

transmitting, with a corresponding one of the different portions of the plurality of transducer elements, a transmit beam having a focal point either behind the array and a region of interest in an image field or beyond the array and the region of interest in the image field; and in response to each transmit beam, receiving at the aperture a plurality of echo signals which are processed to produce a plurality of simultaneous multiline scanlines of coherent echo signals;

at an aperture location at the end of the array transducer, in each of a succession of transmit-receive cycles, transmitting a plurality of transmit beams each having a corresponding focal point either behind the array transducer and a region of interest in the image field or beyond the array and the region of interest in the image field, and receiving in response to each successive transmit beam of the plurality of transmit beams a plurality of echo signals which are processed to produce a second plurality of simultaneous multiline scanlines of coherent echo signals; and combining the second plurality of simultaneous multiline scanlines from the succession of the transmit-receive cycles to generate a third plurality of simultaneous multiline scanlines of coherent echo signals, wherein the plurality of transmit beams transmitted successively from the aperture location at the end of the array transducer each have a different angle relative to the array and a different focal point location along a direction of the array, wherein for each of the plurality of transmit beams, scanlines for corresponding ones of the second plurality of simultaneous multiline scanlines are at a different angle to the face of the array.

2. The method of claim 1, wherein each transmit beam of the plurality of transmit beams has a focal point behind the array and the region of interest in the image field, and wherein transmitting the plurality of transmit beams from the aperture location at the end of the array transducer comprises translating the focal point toward a center of the array for each transmission of a transmit beam of the plurality of transmit beams to increase an angle of the transmit beam of the plurality of transmit beams relative to the array.

3. The method of claim 1, wherein each transmit beam of the plurality of transmit beams has a focal point beyond the array and the region of interest in the image field, and wherein transmitting the plurality of transmit beams from the aperture location at the end of the array comprises translating the focal point away from a center of the array for each transmission of a transmit beam of the plurality of transmit beams to increase an angle of the transmit beam of the plurality of transmit beams relative to the transducer array.

4. The method of claim 1, wherein transmitting the transmit beam having the focal point behind or beyond the region of interest further comprises transmitting the transmit beam centered on the region of interest in the image field.

5. The method of claim 1, further comprising receiving, at a second plurality of different aperture locations, a plurality of multiline scanlines at one aperture location which are respectively axially aligned with a plurality of multiline scanlines received at another aperture location.

6. The method of claim 5, further comprising combining the multiline scanlines from the second plurality of different aperture locations, which are axially aligned.

7. The method of claim 1, further comprising combining echo signals of multiline scanlines received at the aperture location at the end of the array which are received from a common spatial location.

8. The method of claim 1, further comprising combining echo signals of multiline scanlines received at the aperture location at the end of the array by spatial interpolation.

9. An ultrasonic diagnostic imaging system comprising:
an array comprising a plurality of transducer elements and an aperture;
a transmit beamformer coupled to the array; and
a plurality of multiline processors,
wherein the system is arranged to acquire ultrasonic images with the array by:
translating the aperture across a plurality of aperture locations of the array by sequentially activating different portions of the plurality of transducer elements at corresponding ones of the plurality of aperture locations, wherein a number of transducer elements of individual ones of the different portions of the plurality of transducer elements is less than a number of the plurality of transducer elements of the array, wherein at each of the plurality of aperture locations the transmit beamformer is arranged, in a transmit-receive cycle, to transmit a transmit beam which has a focal point either behind the array and a region of interest in an image field or beyond the array and the region of interest in the image field, and receiving from the aperture, in response to a respective transmit beam, a plurality of echo signals which are processed by the multiline processors to produce a plurality of simultaneous multiline scanlines of coherent echo signals;

wherein the transmit beamformer is further arranged to cause, in successive transmit-receive cycles, a portion of the plurality of transducer elements corresponding to the aperture at an aperture location at the end of the array, to transmit a plurality of transmit beams each having a focal point either behind the array and the region of interest in the image field or beyond the array transducer and the region of interest in the image field, and to receive in response to each successive transmit beam of the plurality of transmit beams, a plurality of echo signals which are processed by the multiline processors to produce a second plurality of simultaneous multiline scanlines of coherent echo signals, wherein each of the plurality of transmit beams transmitted from the aperture location at the end of the array transducer has a different angle relative to the array and a different focal point location along a direction of the array transducer, wherein for each of the plurality of transmit beams, scanlines for each of the plurality of simultaneous scanlines are at a different angle to the face of the array, and the multiline processors are further configured to combine the second plurality of simultaneous multiline scanlines to generate a third plurality of simultaneous multiline scanlines of coherent echo signals.

10. The ultrasonic diagnostic imaging system of claim 9, wherein the multiline processors process echo signals received from the region of interest and delay and combine the echo signals to produce a plurality of multiline scanlines of coherent echo signals in response to a single transmit beam.

11. The ultrasonic diagnostic imaging system of claim 9, wherein the transmit beamformer is configured to determine the focal point of a transmit beam of the plurality of transmit beams and an angle of the transmit beam of the plurality of transmit beams relative to the array of transducer elements.

12. The ultrasonic diagnostic imaging system of claim 9, further comprising a plurality of delays and a summer, responsive to co-aligned multiline scanlines which delay and sum echo signals to produce synthetically focused echo signals.

13. The ultrasonic diagnostic imaging system of claim 9, wherein the system is further configured to image by combining echo signals which are received from a common spatial location by the aperture when located at the end of the array.

14. The ultrasonic diagnostic imaging system of claim 9, configures such that, at each of a plurality of aperture locations between the end location, the transmit beamformer transmits a plurality of transmit beams in successive transmit-receive cycles at different beam angles, and echo signals returned from common points in response to the plurality of beams transmitted at different beam angles at an aperture location are coherently combined in spatial compounding.

\* \* \* \* \*